United States Patent
Muhlestein (10) Patent No.: US 7,523,487 B2
(45) Date of Patent: *Apr. 21, 2009

(54) DECENTRALIZED VIRUS SCANNING FOR STORED DATA

(75) Inventor: Mark Muhlestein, Tucson, AZ (US)

(73) Assignee: Netapp, Inc., Sunnyvale, CA (US)

( * ) Notice: Subject to any disclaimer, the term of this patent is extended or adjusted under 35 U.S.C. 154(b) by 753 days.

This patent is subject to a terminal disclaimer.

(21) Appl. No.: 10/010,959

(22) Filed: Nov. 30, 2001

(65) Prior Publication Data

US 2002/0103783 A1 Aug. 1, 2002

Related U.S. Application Data

(63) Continuation-in-part of application No. 09/728,701, filed on Dec. 1, 2000.

(51) Int. Cl.
*G06F 7/04* (2006.01)
*G06F 17/30* (2006.01)
*G06F 7/58* (2006.01)
*G06F 15/16* (2006.01)
*G06K 9/00* (2006.01)
*G06K 19/00* (2006.01)
*H04L 9/32* (2006.01)

(52) U.S. Cl. ............... 726/3; 726/24; 713/155; 713/193

(58) Field of Classification Search ............. 713/188, 713/200

See application file for complete search history.

(56) References Cited

U.S. PATENT DOCUMENTS

| 4,104,718 | A | * | 8/1978 | Poublan et al. ............... 707/8 |
| 4,937,763 | A | | 6/1990 | Mott |
| 5,067,099 | A | | 11/1991 | McCown et al. |
| 5,261,051 | A | | 11/1993 | Masden et al. |
| 5,392,446 | A | | 2/1995 | Tower et al. |

(Continued)

FOREIGN PATENT DOCUMENTS

EP 0 903 901 3/1999

(Continued)

OTHER PUBLICATIONS

Internet Content Adaptation Protocol (CAP) Forum. FAQs and Answers. Jul. 13, 2001.

(Continued)

*Primary Examiner*—Matthew B Smithers
*Assistant Examiner*—Nadia Khoshnoodi
(74) *Attorney, Agent, or Firm*—Perkins Coie LLP (57) ABSTRACT

The invention provides a method and system for performing specialized services for files at a server, such as scanning files for viruses. A filer or other server is connected to one or more supplementary computing devices that scan requested files to ensure they are virus free prior to delivery to end users. When an end user requests a file the following steps occur: The server determines whether the file requested must be scanned before delivery to the end user. The server opens a channel to one of the external computing devices and sends the filename. The external computing device opens the file and scans it. The external computing device notifies the filer the results of the file scan operation. The server sends the file to the end user provided the status indicates it may do so.

15 Claims, 2 Drawing Sheets

U.S. PATENT DOCUMENTS

| | | | |
|---|---|---|---|
| 5,396,609 A | * | 3/1995 | Schmidt et al. ............ 711/163 |
| 5,604,862 A | * | 2/1997 | Midgely et al. ............... 714/6 |
| 5,623,600 A | * | 4/1997 | Ji et al. ......................... 726/24 |
| 5,630,049 A | | 5/1997 | Cardoza et al. |
| 5,649,099 A | | 7/1997 | Theimer et al. |
| 5,649,152 A | | 7/1997 | Ohran et al. |
| 5,682,535 A | | 10/1997 | Knudsen |
| 5,771,354 A | | 6/1998 | Crawford |
| 5,787,409 A | | 7/1998 | Seiffert et al. |
| 5,819,047 A | | 10/1998 | Bauer et al. |
| 5,819,292 A | | 10/1998 | Hitz et al. |
| 5,835,953 A | | 11/1998 | Ohran |
| 5,918,008 A | | 6/1999 | Togawa et al. |
| 5,925,126 A | | 7/1999 | Hsieh |
| 5,933,594 A | | 8/1999 | La Joie et al. |
| 5,946,690 A | | 8/1999 | Pitts |
| 5,963,962 A | | 10/1999 | Hitz et al. |
| 5,968,176 A | | 10/1999 | Nessett et al. |
| 6,076,105 A | | 6/2000 | Wolff et al. |
| 6,088,803 A | * | 7/2000 | Tso et al. ...................... 726/22 |
| 6,101,558 A | | 8/2000 | Utsunomiya et al. |
| 6,108,785 A | * | 8/2000 | Poisner ......................... 726/20 |
| 6,115,741 A | | 9/2000 | Domenikos |
| 6,138,126 A | | 10/2000 | Hitz et al. |
| 6,148,349 A | | 11/2000 | Chow et al. |
| 6,185,598 B1 | | 2/2001 | Farber et al. |
| 6,189,114 B1 | | 2/2001 | Orr |
| 6,226,752 B1 | * | 5/2001 | Gupta et al. .................... 726/9 |
| 6,230,200 B1 | | 5/2001 | Forecast et al. |
| 6,237,114 B1 | | 5/2001 | Wookey et al. |
| 6,253,217 B1 | | 6/2001 | Dourish et al. |
| 6,256,773 B1 | | 7/2001 | Bowman-Amuah |
| 6,266,774 B1 | | 7/2001 | Sampath et al. |
| 6,275,393 B1 | | 8/2001 | Baudelot et al. |
| 6,275,939 B1 | * | 8/2001 | Garrison ........................ 726/6 |
| 6,324,581 B1 | | 11/2001 | Xu et al. |
| 6,327,594 B1 | | 12/2001 | Van Huben et al. |
| 6,327,658 B1 | * | 12/2001 | Susaki et al. ................ 713/176 |
| 6,327,677 B1 | | 12/2001 | Garg et al. |
| 6,338,141 B1 | | 1/2002 | Wells |
| 6,401,126 B1 | | 6/2002 | Douceur et al. |
| 6,405,327 B1 | | 6/2002 | Sipple et al. |
| 6,490,666 B1 | | 12/2002 | Cabrera et al. |
| 6,502,102 B1 | | 12/2002 | Haswell et al. |
| 6,519,679 B2 | | 2/2003 | Devireddy et al. |
| 6,523,027 B1 | | 2/2003 | Underwood |
| 6,542,967 B1 | | 4/2003 | Major |
| 6,560,632 B1 | | 5/2003 | Chess et al. |
| 6,577,636 B1 | | 6/2003 | Sang et al. |
| 6,606,744 B1 | | 8/2003 | Mikurak |
| 6,697,846 B1 | | 2/2004 | Soltis |
| 6,721,721 B1 | * | 4/2004 | Bates et al. ..................... 707/1 |
| 6,721,862 B2 | | 4/2004 | Grant et al. |
| 6,728,766 B2 | | 4/2004 | Cox et al. |
| 6,757,753 B1 | | 6/2004 | DeKoning et al. |
| 6,757,794 B2 | | 6/2004 | Cabrera et al. |
| 6,785,732 B1 | | 8/2004 | Bates et al. |
| 6,801,949 B1 | * | 10/2004 | Bruck et al. ................. 709/232 |
| 6,802,012 B1 | * | 10/2004 | Smithson et al. ............. 726/24 |
| 6,832,313 B1 | | 12/2004 | Parker |
| 6,859,841 B2 | | 2/2005 | Narad et al. |
| 6,918,113 B2 | * | 7/2005 | Patel et al. ................... 717/178 |
| 6,931,540 B1 | * | 8/2005 | Edwards et al. ............. 713/188 |
| 6,981,070 B1 | | 12/2005 | Luk et al. |
| 6,985,927 B2 | | 1/2006 | O'Brien et al. |
| 7,020,697 B1 | | 3/2006 | Goodman et al. |
| 7,032,022 B1 | | 4/2006 | Shanumgam et al. |
| 7,089,293 B2 | | 8/2006 | Grosner et al. |
| 7,124,180 B1 | | 10/2006 | Ranous |
| 7,146,377 B2 | | 12/2006 | Nowicki et al. |
| 7,237,027 B1 | | 6/2007 | Raccah et al. |
| 7,293,083 B1 | | 11/2007 | Ranous et al. |
| 7,349,960 B1 | | 3/2008 | Pothier et al. |
| 2001/0013064 A1 | | 8/2001 | Cox et al. |
| 2002/0040405 A1 | | 4/2002 | Gold |
| 2002/0042866 A1 | | 4/2002 | Grant et al. |
| 2002/0065946 A1 | | 5/2002 | Narayan |
| 2002/0087479 A1 | | 7/2002 | Malcolm |
| 2002/0103907 A1 | | 8/2002 | Petersen |
| 2002/0120741 A1 | | 8/2002 | Webb et al. |
| 2002/0124090 A1 | | 9/2002 | Poier et al. |
| 2002/0133491 A1 | | 9/2002 | Sim et al. |
| 2002/0133561 A1 | | 9/2002 | O'Brien et al. |
| 2002/0194251 A1 | | 12/2002 | Richter et al. |
| 2003/0045069 A1 | | 3/2003 | Gilgen et al. |
| 2003/0046396 A1 | | 3/2003 | Richter et al. |
| 2003/0056069 A1 | | 3/2003 | Cabrera et al. |
| 2003/0191957 A1 | | 10/2003 | Hypponen et al. |
| 2003/0195895 A1 | | 10/2003 | Nowicki et al. |
| 2004/0044744 A1 | | 3/2004 | Grosner et al. |
| 2004/0078419 A1 | | 4/2004 | Ferrari et al. |
| 2004/0148382 A1 | | 7/2004 | Narad et al. |
| 2004/0226010 A1 | * | 11/2004 | Suorsa ........................ 717/174 |
| 2004/0230795 A1 | | 11/2004 | Armitano et al. |
| 2005/0138204 A1 | | 6/2005 | Iyer et al. |
| 2005/0251500 A1 | | 11/2005 | Vahalia et al. |
| 2006/0195616 A1 | | 8/2006 | Petersen |
| 2008/0066151 A1 | | 3/2008 | Thomsen et al. |

FOREIGN PATENT DOCUMENTS

| | | |
|---|---|---|
| EP | 903901 A2 * | 3/1999 |
| EP | 1100001 A2 | 5/2001 |
| JP | 2004-523820 A | 8/2004 |
| JP | 2004/523820 A | 8/2004 |
| WO | WO 97/39399 | 10/1997 |
| WO | WO 97/49252 | 12/1997 |
| WO | WO 02/44862 A2 | 6/2002 |
| WO | WO 02/095588 A2 | 11/2002 |

OTHER PUBLICATIONS

Network Appliance. Data ONTAP Event Management System. Aug. 10, 2000.

TUX 2: Slashdot.com. TUX2: The File System That Would Be King. Oct. 20, 2000.

Norton, Peter et al. "Chapter 3—Norton Utilities: The System Doctor Is In." and "Chapter 13—Norton Utilities: The Better Part of Valor . . . " Peter Norton's Complete Guide to Norton SystemWorks 2.0, 1999, Sams.

Wybranietz, D. et al. "Monitoring and Performance Measuring Distributed Systems During Operation." Joint International Conference on Measurement and Modeling of Computer Systems, 1988, pp. 197-206, ACM Press, New York, NY.

Jieh-Sheng Lee "A Generic Virus Detection Agent on the Internet" System Sciences, 1997, pp. 210-219, vol. 4 Center of Computing Services, Hua-Fan Institute of Technology, Shi-Tang, Taipei, Taiwan.

PCT Search Report; PCT/US0146688; Sep. 22, 2006.

PCT Search Report; PCT/US0151581; Oct. 10, 2006.

PCT Search Report; PCT/US0151581; Sep. 21, 2006.

Lomb, Reiner et al., "Storage Management Solutions for Distributed Computing Environments," Hewlett-Packard Journal, Oct. 1996, 12 pages.

* cited by examiner

DECENTRALIZED VIRUS SCANNING FOR STORED DATA

BACKGROUND OF THE INVENTION

1. Field of the Invention

This invention relates to decentralized virus scanning for stored data, such as for example in a networked environment.

2. Related Art

Computer networking and the Internet in particular offer end users unprecedented access to information of all types on a global basis. Access to information can be as simple as connecting some type of computing device using a standard phone line to a network. With the proliferation of wireless communication, users can now access computer networks from practically anywhere.

Connectivity of this magnitude has magnified the impact of computer viruses. Viruses such as "Melissa" and "I love you" had a devastating impact on computer systems worldwide. Costs for dealing with viruses are often measured in millions and tens of millions of dollars. Recently it was shown that hand-held computing devices are also susceptible to viruses.

Virus protection software can be very effective in dealing with viruses, and virus protection software is widely available for general computing devices such as personal computers. There are, however, problems unique to specialized computing devices, such as such as for example servers, file servers, storage systems, and devices of any kind performing storage and retrieval of data. Off-the-shelf virus protection software will not run on a specialized computing device unless it is modified to do so, and it can be very expensive to rewrite software to work on another platform.

A first known method is to scan for viruses at the data source. When the data is being provided by a specialized computing device the specialized computing device must be scanned. Device-specific virus protection software must be written in order to scan the files on the device.

While this first known method is effective in scanning files for viruses, it suffers from several drawbacks. First, a company with a specialized computing device would have to dedicate considerable resources to creating virus protection software and maintaining up-to-date data files that protect against new viruses as they emerge.

Additionally, although a manufacturer of a specialized computing device could enlist the assistance of a company that creates mainstream virus protection software to write the custom application and become a licensee this would create other problems, such as reliance on the chosen vendor of the anti-virus software, compatibility issues when hardware upgrades are effected, and a large financial expense.

A second known method for protecting against computer viruses is to have the end user run anti-virus software on their client device. Anti-virus software packages are offered by such companies as McAfee and Symantec. These programs are loaded during the boot stage of a computer and work as a background job monitoring memory and files as they are opened and saved.

While this second known method is effective at intercepting and protecting the client device from infection, it suffers from several drawbacks. It places the burden of detection at the last possible link in the chain. If for any reason the virus is not detected prior to reaching the end user it is now at the computing device where it will do the most damage (corrupting files and spreading to other computer users and systems).

It is much better to sanitize a file at the source from where it may be delivered to millions of end users rather than deliver the file and hope that the end user is prepared to deal with the file in the event the file is infected. End users often have older versions of anti-virus software and/or have not updated the data files that ensure the software is able to protect against newly discovered viruses, thus making detection at the point of mass distribution even more critical.

Also, hand-held computing devices are susceptible to viruses, but they are poorly equipped to handle them. Generally, hand-held computing devices have very limited memory resources compared to desktop systems. Dedicating a portion of these resources to virus protection severely limits the ability of the hand-held device to perform effectively. Reliable virus scanning at the information source is the most efficient and effective method.

Protecting against viruses is a constant battle. New viruses are created everyday requiring virus protection software manufacturers to come up with new data files (solution algorithms used by anti-virus applications). By providing protection at the source of the file, viruses can be eliminated more efficiently and effectively.

Security of data in general is important. Equally important is the trust of the end user. This comes from the reputation that precedes a company, and companies that engage in web commerce often live and die by their reputation. Just like an end user trusts that the credit card number they have just disclosed for a web-based sales transaction is secure they want files they receive to be just as secure.

Accordingly, it would be desirable to provide a technique for scanning specialized computing devices for viruses and other malicious or unwanted content that may need to be changed, deleted, or otherwise modified.

SUMMARY OF THE INVENTION

The invention provides a method and system for performing specialized services for files at a server, such as scanning files at a storage system, filer, or other server performing storage and retrieval of data, for viruses by secondary computing devices. The server (such as a filer) is connected to one or more supplementary computing devices that scan requested files upon request to ensure they are virus free prior to delivery to end users. When an end user requests a file from the server the following steps occur: The server determines whether the file or other object requested by the user must be scanned before delivery to, or after use by, the user. The server opens a channel to one of the external computing devices and sends the filename (or some other designator of the file or object, such as a file handle or an i-node pointer; "filename," "file name space" and the like refer to the collection of possible designators for files or other types of object). The external computing device opens the file and scans it. After possibly taking remedial actions (such as for example cleaning the file of the virus, quarantining or deleting the file), the external computing device notifies the filer the status of the file scan operation. The server sends the file to the end user provided the status indicates it may do so.

This system is very efficient and effective, as a file needs only to be scanned one time for a virus unless the file has been modified or new data files that protect against new viruses have been added. Scan reports for files that have been scanned may be stored in one or more of the external computing devices, in one or more servers, and some portion of a scan report may be delivered to end users.

In alternative embodiments of the invention one or more of the external computing devices may be running other supplementary applications, such as data compression and decompression, data encryption and decryption, and database compaction, independently or in some combination.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

filer—In general, this refers to any storage system, file server, or other device performing storage and retrieval of data. Storage systems might be implemented in any one of a large variety of ways, including but not limited to a network-attached storage environment; a storage area network; a disk assembly coupled to a client device, a server device, or a host computer; or some combination thereof.

One type of storage system is a file server. A file server or filer includes a computer that provides file services relating to the organization of information on writeable persistent storage devices, such as memories, tapes or disks of an array. The filer might include a storage operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, might be implemented as a specially formatted file in which information about other files and directories are stored. In general, the term "storage operating system" refers to computer-executable code that implements data storage functionality, such as file system semantics, and manages data access. A storage operating system can be implemented as an application program operating over a general-purpose operating system, such as UNIX® or Windows NT®, or as a general-purpose operating system with storage functionality or with configurable functionality that is configured for storage applications, or as a special-purpose operating system dedicated to performing a limited range of functionality including storage and related tasks in storage appliances and other devices.

A storage system may be further configured to operate according to a client/server model of information delivery to thereby allow many clients to access files stored on a server, e.g., the storage system. In this model, the client may comprise an application executing on a computer that "connects" to the storage system over a computer network, such as a point-to-point link, shared local area network, wide area network or virtual private network implemented over a public network, such as the Internet. Each client may request the services of the file system on the storage system by issuing file system protocol messages (in the form of packets) to the system over the network. It should be noted, however, that the storage system may alternatively be configured to operate as an assembly of storage devices that is directly-attached to a (e.g., client or "host") computer. Here, a user may request the services of the file system to access (i.e., read and/or write) data from/to the storage devices.

Although the invention is described herein with reference to a "filer," there is no particular limitation of the invention to filers, file servers, storage systems, or similar devices. It would be clear to those skilled in the art, after perusal of this application, how to implement the ideas and techniques described herein for all types of server devices. Such implementations would not require any undue experimentation or further invention, and are within the scope and spirit of the invention.

i-node—In general, this refers to a directory entry or other file descriptor entry persistently maintained by a system performing storage and retrieval of data. In a preferred embodiment, each file has an i-node, and the i-node is persistently recorded in a directory for that file. Although the term "i-node" is sometimes referred to in the known art as being particular the Unix operating system and variants thereof, it is used in this description much more generally, as noted herein. There is no particular requirement in the invention that i-nodes must have any particular structure, or must be stored in any particular format or place, or are specific to any particular operating system, storage operating system, storage structure, hierarchical file system, file name space, or storage paradigm.

file or other object—In general, this refers to any data object at the server, whether a sequential set of bytes, a set of records in a data base, a software object in an object-oriented database or an object-oriented language development environment, or any dynamically generated set of data for which a user request is appropriate. In a preferred embodiment, a file includes a set of data persistently recorded in a hierarchical namespace and having a set of file attributes. While this is preferred, there is no particular requirement that a file or other object requested by the user have these properties, or any particular other properties, as the scope and spirit of the invention is broad enough to include all types of objects.

virus—In general, this refers to any manmade program or piece of code that is loaded onto a computer without the computer user's knowledge and runs against their wishes. Most viruses can also replicate themselves, and the more dangerous types of viruses are capable of transmitting themselves across networks and bypassing security systems. A "virus" can also include any malicious code, program, or other internal component (including but not limited to a computer virus, computer worm, computer time bomb, Trojan horse, or component with similar effect), that could damage, destroy, alter, or take control of, software, firmware, or hardware, or could, in any manner, reveal, damage, destroy, or alter any data or other information accessed through or processed by the computer in any manner.

client and server—in general, these terms refer to a relationship between two devices, particularly to their relationship as client and server, not necessarily to any particular physical devices.

For example, but without limitation, a particular client device in a first relationship with a first server device, can serve as a server device in a second relationship with a second client device. In a preferred embodiment, there are generally a relatively small number of server devices servicing a relatively larger number of client devices.

client device and server device—in general, these terms refer to devices taking on the role of a client device or a server device in a client-server relationship (such as an HTTP web client and web server). There is no particular requirement that any client devices or server devices must be individual physical devices. They can each be a single device, a set of cooperating devices, a portion of a device, or some combination thereof.

For example, but without limitation, the client device and the server device in a client-server relation can actually be the same physical device, with a first set of software elements serving to perform client functions and a second set of software elements serving to perform server functions.

Although the invention is described with regard to a client-server model, there is no particular requirement in the invention that the stored data is maintained and communicated to users using a client-server model. For example, other forms of distributed computing in which a user request for access to data objects triggers decentralized processing by one or more of a set of computing devices would also be within the scope and spirit of the invention.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
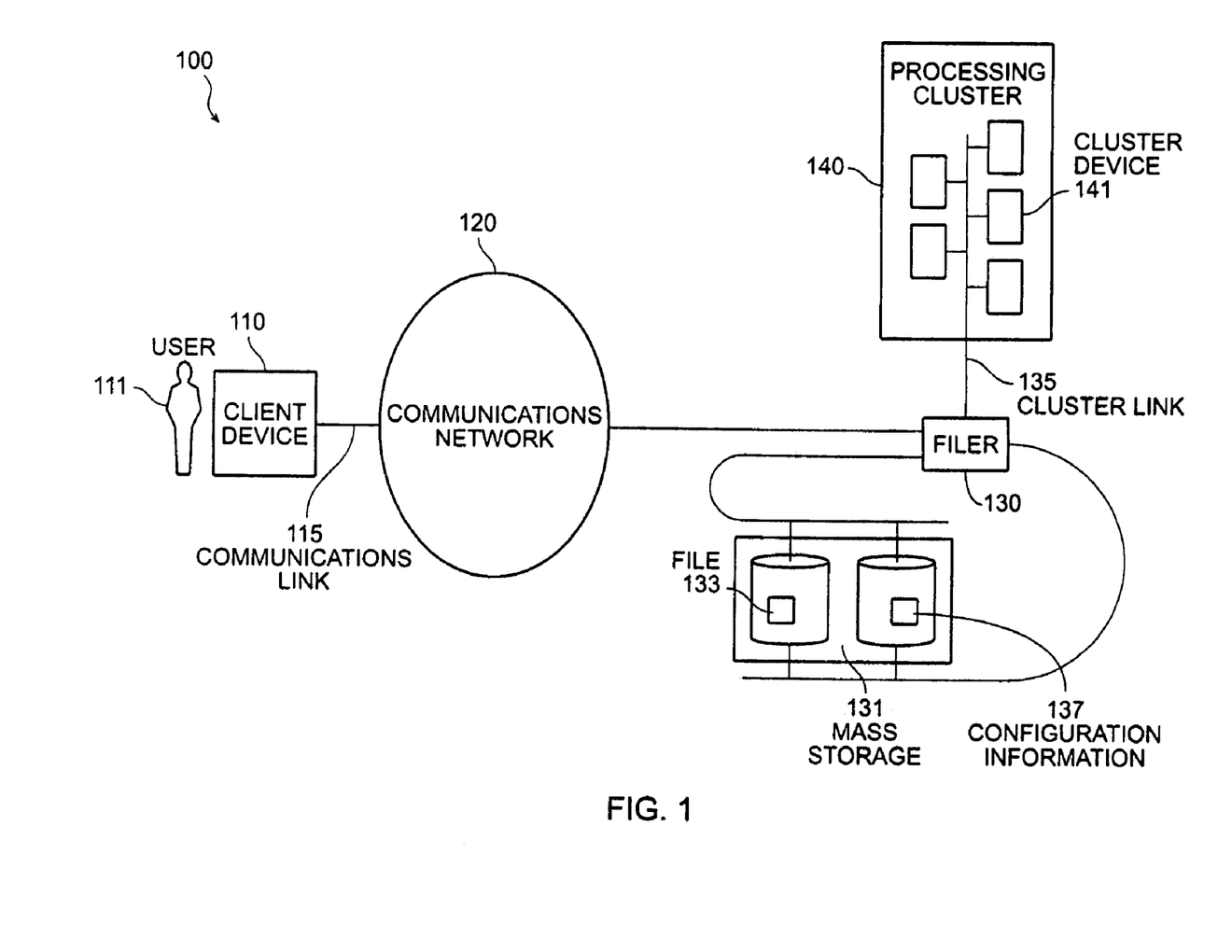
FIG. 1 shows a block diagram of a system for decentralized appliance virus scanning.

FIG. 1 shows a block diagram of a system for decentralized appliance virus scanning.

A system 100 includes a client device 110 associated with a user 111, a communications network 120, a filer 130, and a processing cluster 140.

The client device 110 includes a processor, a main memory, and software for executing instructions (not shown, but understood by one skilled in the art). Although the client device 110 and filer 130 are shown as separate devices there is no requirement that they be physically separate.

In a preferred embodiment, the communication network 120 includes the Internet. In alternative embodiments, the communication network 120 may include alternative forms of communication, such as an intranet, extranet, virtual private network, direct communication links, or some other combination or conjunction thereof.

A communications link 115 operates to couple the client device 110 to the communications network 120.

The filer 130 includes a processor, a main memory, software for executing instructions (not shown, but understood by one skilled in the art), and a mass storage 131. Although the client device 110 and filer 130 are shown as separate devices there is no requirement that they be separate devices. Moreover, although the invention is described with regard to a single filer 130, the invention is equally applicable to sets of filers 130 operating with the processing cluster 140. A set of multiple filers 130 might each one operate independently and each one make individual use of the processing cluster 140, or might operate in conjunction as a group and make use of the processing cluster 140 as a collective entity, or some combination thereof. Since, as noted below, the processing cluster 140 can include one or more cluster devices 141, the invention can be performed with any set of M filers and any set of N processors. There is no particular requirement that M or N must be fixed; either filers 130 or cluster devices 141 might be added by operator command or by a handshaking protocol while filers 130 and cluster devices 141 are operating. The filer 130 is connected to the communications network 120.

The filer 130 includes a set of configuration information 137 disposed so that a processor for the filer 130 can readily access that configuration information 137. In a preferred embodiment, the filer 130 includes software instructions for reviewing, reporting, editing, or modifying the configuration information 137, as directed by an operator, or possibly by a remote user having designated privileges. The configuration information 137 includes the following:

Information indicating a first set of file types for which virus scanning is enabled (such as executable files, often designated by the file name extension EXE), and a second set of file types for which virus scanning is disabled (such as raw text files, often designated by the file name extension TXT);

Information indicating a first file space for which virus scanning is enabled for all file operations (such as a first CIFS "share" designated by its root directory, for example /users/Swemofsky), a second file space for which virus scanning is enabled for file write operations only (such as a second CIFS "share"), and a third file space for which virus scanning is disabled (again, such as a third CIFS "share"); and     Information indicating for each file whether that file has been scanned for a virus, and if so, what date and time that scan was performed (such as a timestamp), by what type of scanning device or scanning software that scan was performed (such as the make and version number of the scanning software), and what the results of that scan were (such as whether a virus was detected and what actions were taken if a virus was in fact detected). In a preferred embodiment, this information is recorded in an i-node for the file, or if the file is read-only or if the i-node is unwritable (such as if the file is part of a read-only snapshot), in a separate scanning history database.

The mass storage 131 includes at least one file 133 that is capable of being requested by a client device 110. The processing cluster 140 includes one or more cluster device 141 each including a processor, a main memory, software for executing instructions, and a mass storage (not shown but understood by one skilled in the art). Although the filer 130 and the processing cluster 140 are shown as separate devices there is no requirement that they be separate devices.

In a preferred embodiment the processing cluster 140 is a plurality of personal computers in an interconnected cluster capable of intercommunication and direct communication with the filer 130. There is no particular requirement that the processing cluster 140 must be organized as a unified cluster, or must be local to the filer 130, or must be homogeneous in the nature of the processing devices, or have any other particular characteristics. For example, in alternative embodiments, the processing cluster 140 includes a set of PC's, workstations, servers, or other devices, coupled to the filer 130 by means of a network such as the Internet.

In a preferred embodiment, cluster devices 141 in the processing cluster 140 register their presence with the filer 130, thus giving the filer 130 knowledge of their availability to perform scanning (or other) operations. While this is preferred, there is no particular requirement for the invention for registration, as the filer 130 may in alternative embodiments be configured to send out "John Doe" requests for cluster devices 141 to process files requested by the user.

The cluster link 135 operates to connect the processing cluster 140 to the filer 130. The cluster link 135 may include non-uniform memory access PUMA), or communication via an intranet, extranet, virtual private network, direct communication links, or some other combination or conjunction thereof.

Method of Operation

Figure 2:
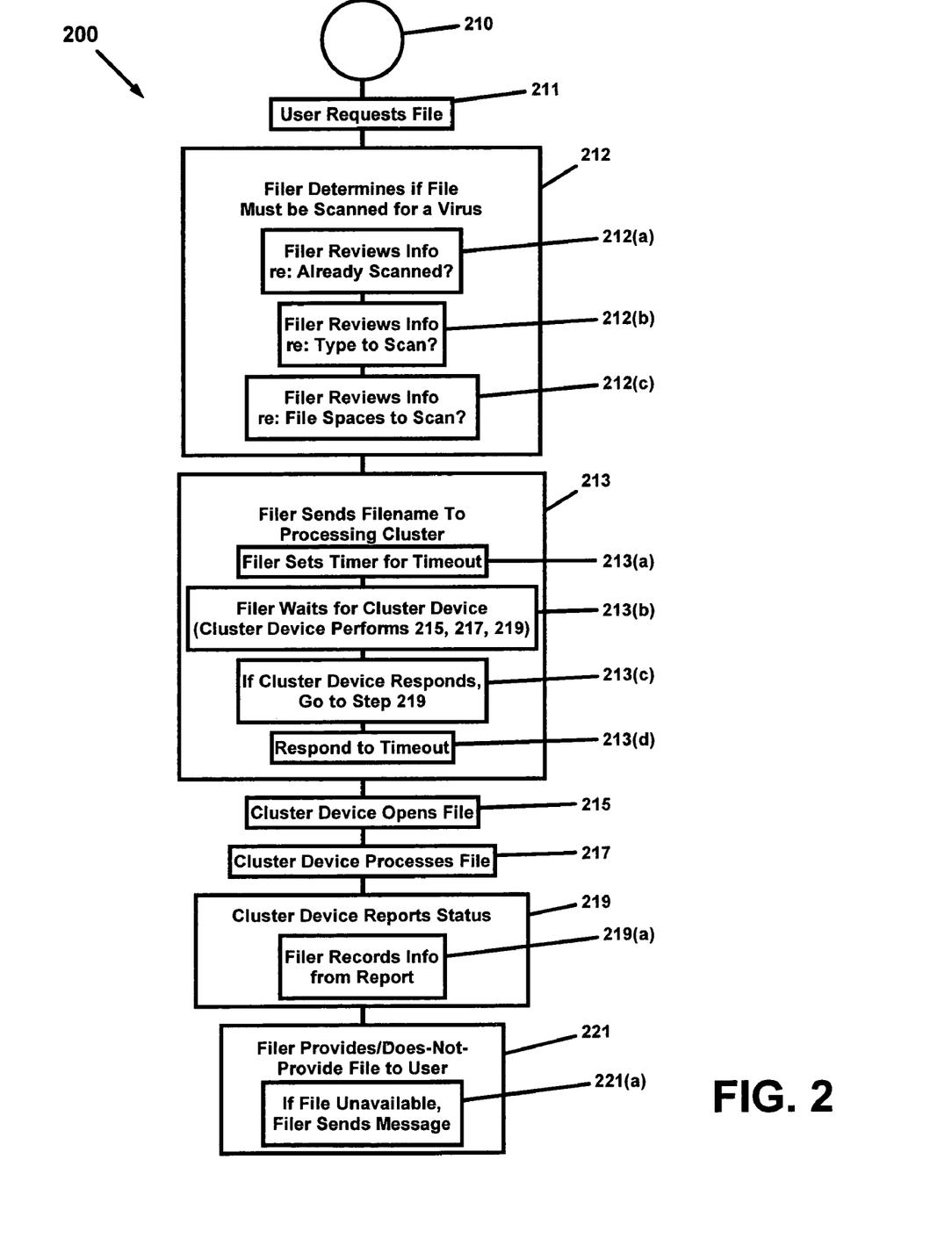
FIG. 2 shows a process flow diagram for a system for decentralized virus scanning

FIG. 2 shows a process flow diagram for a system for decentralized appliance virus scanning.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the system 100 is ready to begin performing the method 200.

At a step 211, a user 111 utilizes the client device 110 to initiate a request for a file 133. The request is transmitted to the filer 130 via the communications network 120. In a preferred embodiment the filer 130 is an independent file server performing file retrieval and storage in response to a file server protocol such as NFS or CIFS. In alternative embodiments, the filer 130 might be a supplemental storage device or file maintenance server operating at the direction of another server, such as a web server.

At a step 212, the filer 130 receives the request for the file 133 and determines if the file 133 must be scanned for a virus. As part of this step, the filer 130 performs the following sub-steps:

At a sub-step 212(a), the filer 130 reviews its information regarding whether the file 133 has already been scanned for a virus. In a preferred embodiment, that information includes whether a scan has already been performed, what date and time that scan was performed (such as a timestamp), by what type of scanning device or scanning software that scan was performed (such as the make and version number of the scanning software), and what the results of that scan were (such as whether a virus was detected and what actions were taken if a virus was in fact detected). As noted above, in a preferred embodiment, this information is recorded in the i9 node for the file 133. If the file 133 has already been scanned and is marked available for use (and the filer determines that no re-scan is required), the filer 130 makes the file available to the user without performing the scanning operation.

At a sub-step 212(b), the filer 130 reviews its information regarding what types of files 133 it should scan for a virus. The filer reviews its configuration information 137 describing a set of file types (1) that should be scanned for a virus, such as executable files, macros, scripts, and the like, and (2) that should not be scanned for a virus, such as raw text files and the like. This set of file types might be selected by an operator for the filer 130, and is maintained with the configuration information 137. In a preferred embodiment, file types are identified by portions of the file name for the file 133, such as a file name extension. Known file name extensions include EXE for executable files and TXT for raw text files.

At a sub-step 212(c), the filer 130 reviews its information regarding what file spaces it should scan for a virus. The filer reviews its configuration information 137 describing which file spaces should be scanned for (1) all file operations, (2) only file write operations, or (3) no file operations. Where the file space should be scanned for all file operations, the filer 130 causes the file 133 to be scanned before the file 133 is opened for any read operation and after the file 133 is closed after a write operation. Where the file space should be scanned for only file write operations, the filer 130 causes the file 133 to be scanned after the file 133 is closed after a write operation.

At a step 213, the filer 130, having determined that the file 133 should be scanned, sends the file ID and path of the file 133 to the processing cluster 140 where it is received by one of the cluster devices 141. As part of this step, the filer 130 performs the following sub-steps:

At a sub-step 213(a), the filer 130 sets a timer to a cluster processor timeout value, indicating how long the filer 130 is willing to wait for a cluster device 141 to work.

At a sub-step 213(b), the filer 130 waits for the cluster device 141 to complete its work. While doing so, the cluster device 141 (hopefully) performs step 215, step 217, and step 219 described below.

At a sub-step 213(c), if the cluster device 141 responds before the timeout, the filer 130 proceeds with the step 219 below, using the results from the cluster device 141.

At a sub-step 213(d), if the cluster device 141 does not respond before the timeout, the filer 130 might proceed in one of two ways: (a) The filer 130 proceeds with the step 219 below, acting as if the cluster device 141 refused user access to the file. In this case, the filer 130 reports that the file is not available due to the scan having failed. (b) The filer 130 sends an ARE-YOU-WORKING? message to the cluster device 141. In this case, if the cluster device 141 responds, within a second but shorter timeout, that it is still working on the file 133, the filer 130 returns to the sub-step 213(b) and resets the timeout.

In a preferred embodiment, there is more than one cluster device 141, so the filer 130 can proceed to service requests for other files 133 even if the cluster device 141 scanning one particular file 133 takes a very long time. In alternative embodiments, the filer 130 may reassign the scanning task to a second cluster device 141 if the filer 130 suspects that the first cluster device 141 has in fact crashed, become unavailable, or otherwise is not likely to respond successfully with a virus scan result for the file 133.

In the event that the user making the original request for the file 133 gives up before the cluster device 141 reports on the file 133, the filer 130 still waits for the report from the cluster device 141, and marks the file 133 with the results of the virus scan performed by the cluster device 141. Thus, if the cluster device 141 determines that the file 133 has no virus (or alternatively, finds a virus but successfully removes it), the filer 130 marks the file as successfully scanned and available for use. If the same user or a different user later requests the same file 133, the filer 130 makes that file 133 available without a further scan, as described below.

At a step 215, the cluster device 141 uses the file ID and path to open the file 133 in the mass storage 131 of the filer 130.

At a step 217, the cluster device 141 scans the file 133 for viruses. In a preferred embodiment, files are tasked to the processing cluster 140 in a round robin fashion. In alternative embodiments files may be processed individually by a cluster device 141, by multiple cluster device 141 simultaneously, or some combination thereof. Load balancing may be used to ensure maximum efficiency of processing within the processing cluster 140.

In a preferred embodiment, the filer 130 groups cluster devices 141 into one or more classes, such as primary and secondary, where all primary cluster devices 141 are assigned, followed by secondary cluster devices 141. This allows an operator to direct the filer 130 to use a first cluster device 141, such as for example available using a relatively rapid connection, exclusively, but when the first cluster device 141 is unavailable for any reason, to fall back to using a second designated cluster device 141, such as for example available using a much less rapid connection.

In certain embodiments, an operation offloaded by the filer 130 to the cluster 140 may include a plurality of individual processes, each of which may be performed at a separate cluster device 141 in the cluster 140.

There are several vendors offering virus protection software for personal computers, thus the operator of the filer 130 may choose whatever product they would like to use that supports the communication protocol with the filer 130 described herein. They may even use combinations of vendors' products in the processing cluster 140, when those combinations can operate using the communication protocol with the filer 130 described herein. In alternative embodiments, the filer 130 may operate with forms of virus protection software that does not support the communication protocol with the filer 130 described herein, with some features (such as the timeout and ARE-YOU-WORKING? message) not available to those forms of virus protection software. In further alternative embodiments of the invention, continual scanning of every file 133 on the filer 130 may take place.

The processing cluster 140 is highly scalable. The price of personal computers is low compared to dedicated devices, such as filers, therefore this configuration is very desirable. Additionally, a cluster configuration offers redundant systems availability in case a cluster device 141 fails—failover and takeover is also possible within the processing cluster.

The cluster device 141 is assigned a special type of access (herein called "OPEN-FOR-SCANNING"), so that the cluster device 141 can scan the file 133 regardless of whether it is already locked by another user. In a preferred embodiment, OPEN-FOR-SCANNING mode is restricted to those devices the filer 130 can verify are actually cluster devices 141. In a preferred embodiment, the filer 130 can restrict OPEN-FOR-SCANNING mode to devices according to one or more of the following criteria:

- having one or more selected IP addresses;
- being included in one or more selected IP subnets;
- being included in one or more selected DNS domains;
- being accessible to the filer 130 via one or more selected physical interfaces;
- having a selected username or user privileges (such as "Administrator" or "Backup Operator") at the cluster device 141.

In a preferred embodiment, OPEN-FOR-SCANNING mode access is restricted to processes running as an NT "Service" on the cluster device 141. Thus, a selected cluster device 141 might be in use by a user having no particularly special privileges, while the cluster device 141 concurrently operates with a service running as "Administrator" and thus being allowed by the filer 130 to have OPEN-FOR-SCANNING mode access.

At a step 219, the cluster device 141 transmits a scan report to the filer 130. The scan report primarily reports whether the file is safe to send. Further information may be saved for statistical purposes (for example, how many files have been identified as infected, was the virus software able to sanitize the file or was the file deleted) to a database. The database may be consulted to determine whether the file 133 needs to be scanned before delivery upon receipt of a subsequent request. If the file 133 has not changed since it was last scanned and no additional virus data files have been added to the processing cluster, the file 133 probably does not need to be scanned. This means the file 133 can be delivered more quickly.

Other intermediary applications may also run separately, in conjunction with other applications, or in some combination thereof within the processing cluster 140. Compression and encryption utilities are some examples of these applications. These types of applications, including virus scanning, can be very CPU intensive, thus outsourcing can yield better performance by allowing a dedicated device like a filer to do what it does best and farm out other tasks to the processing cluster 140.

As part of this step, the filer 130 might also perform the following sub-steps:

At a sub-step 219(a), the filer 130 records information from the scan report in the i-node for the file 133, or in a separate scanning history database if the file is read-only, as noted above.

In a preferred embodiment, the filer 130 includes software instructions for responding to an operator or a privileged remote user to reset the scanning information for a file. This allows an operator or a privileged remote user to force the filer 130 to rescan one or more selected files 133.

At a step 221, the filer 130 transmits or does not transmit the file 133 to the client 110 based on its availability as reported following the scan by the processing cluster 140. Some portion of the scan report may also be transmitted to the user. As part of this step, the filer 130 performs the following sub-steps:

At a sub-step 221(a), if the report from the cluster device 141 indicates that the file 133 is unavailable due to being infected (and the file 133 was not disinfected by the cluster device 141), the filer 130 sends a message box to the requesting user giving at least some information from the report from the cluster device 141. The filer 130 can send this message box to a user making a CIFS request because the CIFS protocol allows the filer 130 to know the IP (internet protocol) address for the user. For NFS, the filer 130 would build a string indicating a path to the requested file 133 and send a message to the user including that string.

At this step, a request for a file 133 has been received, the request has been processed, and if possible a file 133 has been delivered. The process may be repeated at step 211 for subsequent requests.

Generality of the Invention

The invention has wide applicability and generality to other aspects of processing requests for files.

The invention is applicable to one or more of, or some combination of, circumstances such as those involving:

- file compression and decompression—the cluster processors can be used to decompress data for delivery to users, and to compress data received from users for storage.
- file encryption and decryption—the cluster processors can be used to decrypt data for delivery to users, and to encrypt data received from users for storage.

database compaction—the cluster processors can be used to compact data in a database or other structured format for delivery to users, or to compact data received from users for storage.

general outsourcing of CPU intensive tasks from dedicated appliances to general purpose computers—for one example, the cluster processors can be used to translate between data stored in a first form into data presented to users in a second form.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A method comprising:
receiving at a storage server, from a requester, a request for an object stored at the server;
in response to the request, determining at the storage server whether to cause a processing device in a cluster of processing devices to access the object stored at the storage server and perform an operation on the object, wherein the operation is from the set of operations consisting of virus scanning, data decompression, data encryption, and data compaction, wherein the cluster is separate from the storage server and is not in a path from the requester to the object and wherein said determining includes determining whether to cause the processing device to perform the operation based at least partially on a file space containing the object;
selecting, at the storage server, the processing device from among a plurality of processing devices that form the cluster, based on a classification of the processing device relative to other processing devices in the cluster, wherein the classification is based on a performance criterion;
assigning a specific access type to the processing device by the storage server when the storage server verifies the processing device satisfies restriction criteria;
causing the processing device to perform the operation in response to a specified outcome of said determining;
receiving at the storage server a result of the operation from the processing device; and
conditionally allowing access to the object in response to the request according to the result of the operation.

2. A method as in claim 1, wherein the operation includes a plurality of processes, each process being performed at a separate processing device in the cluster.

3. A method as in claim 1, wherein the specific access type allowing the processing device to perform the operation even while another user has a lock on the object.

4. A method as in claim 1, wherein the storage server enforces a timeout for the operation;
wherein even if the timeout expires, the processing device completes the operation and reports the result of the operation to the server; and
herein the storage server stores the result of the operation for possible later use.

5. A method as in claim 1, wherein the operation is performed only if the processing device has open-for-scanning permission to access the object; and
wherein if the processing device has the open-for-scanning permission to access the object, the operation is performed even if the object is locked by another user.

6. An apparatus comprising:
a storage server storing a set of objects and having a network interface; and
a plurality of processing devices configured as a cluster that is connected to the storage server and that is not in a path from a client to the objects stored at the server,
wherein when the storage server receives a client request for an object of the set of objects through the network interface:
the storage server determines whether to cause the processing device to perform an operation on the object, wherein the operation is from the set of operations consisting of virus scanning, data decompression, data encryption, and data compaction, and wherein the storage server determines whether to cause the processing device to perform the operation based at least partially on a file space containing the object;
the storage server selects the processing device from among a plurality of processing devices that form the cluster, based on a classification of the processing device relative to other processing devices in the cluster, wherein the classification is based on a performance criterion;
the storage server assigns a specific access type to the processing device when the storage server verifies the processing device satisfies restriction criteria;
the storage server sends a first message to the processing device that indicates the object to the processing device, in response to a specified outcome of the determination, to cause the processing device to access the object stored at the storage server and perform the operation;
the processing device sends a second message to the storage server that indicates a result of the operation; and
the storage server generates a response to the client request, the response conditionally providing access by the client to the object according to the second message.

7. An apparatus as in claim 6, wherein the storage server enforces a timeout for the second message;
wherein even if the timeout expires, the second message is sent from the processing device to the server; and
wherein the storage server stores the result of the operation for possible later use.

8. An apparatus as in claim 6, wherein the operation is performed only if the processing device has open-for-scanning permission to access the object; and
wherein if the processing device has open-for-scanning permission to access the object, the operation is performed even if the object is locked by another user.

9. An apparatus as in claim 6, wherein the operation includes a plurality of processes, each process being performed at a separate processing device in the cluster.

10. A method comprising:
receiving at a storage server a client request for an object stored at the server;
selecting a processing device from among a plurality of processing devices that form a cluster, based on a classification of the processing device relative to other processing devices in the cluster, wherein the classification is based on a performance criterion;
assigning by the storage server a specific access type to the processing device when the storage server verifies the processing device satisfies restriction criteria, the processing device separate from the storage server and not in a path from the client to the object, the specific access type allowing the processing device to perform an operation on the object even while another client has a lock on the object, wherein the operation is from the set of operations consisting of virus scanning, data decompression, data encryption, and data compaction;

causing the processing device to perform the operation;

receiving at the storage server a result of the operation from the processing device; and conditionally allowing access to the object in response to the client request according to the result of the operation.

11. A method as in claim 10, wherein the operation includes a plurality of processes, each process being performed at a separate processing device in the cluster.

12. An apparatus comprising:

a storage server storing a set of objects and having a network interface; and a processing device coupled to the server, wherein the processing device is one of a plurality of processing devices configured as a cluster which is not in a path from a client to the objects stored at the server, wherein:

the storage server receives a client request for an object of the set of objects through the network interface;

the storage server selects the processing device from among the plurality of processing devices, based on a classification of the processing device relative to other processing devices in the cluster, wherein the classification is based on a performance criterion;

the storage server assigns a specific access type to a processing device when the storage server verifies the processing device satisfies restriction criteria, the processing device separate from the storage server and not in a path from the client to the object, the specific access type allowing the processing device to perform an operation on the object even while another user has a lock on the object, wherein the operation is from the set of operations consisting of virus scanning, data decompression, data encryption, and data compaction;

the storage server causes the processing device to perform the operation;

the storage server receives at the storage server a result of the operation from the processing device; and the storage server conditionally allows access to the object in response to the client request according to the result of the operation.

13. An apparatus as in claim 12, wherein the operation includes a plurality of processes, each process being performed at a separate processing device in the cluster.

14. A storage server comprising:

a processor; and a memory coupled to the processor through a bus, the memory storing executable instructions that cause the processor to select a processing device from among a plurality of processing devices that form a cluster, based on a classification of the processing device relative to other processing devices in the cluster, wherein the classification is based on a performance criterion, and to determine whether to cause a processing device to perform an operation on an object requested by a client and to assign a specific access type to the processing device when the processor verifies the processing device satisfies restriction criteria, wherein the operation is from the set of operations consisting of virus scanning. data decompression, data encryption. and data compaction, the specific access type allowing the processing device to perform an operation on the object even while another user has a lock on the object, wherein the processing device is separate from the storage server and is not in a path from the client to objects stored at the storage server.

15. A storage server as in claim 14, wherein the operation includes a plurality of processes, each process being performed at a separate processing device in the cluster.

* * * * *